United States Patent
Lee et al.

(10) Patent No.: US 10,042,856 B2
(45) Date of Patent: Aug. 7, 2018

(54) METHOD AND ELECTRONIC DEVICE FOR PROCESSING DATA

(71) Applicant: Samsung Electronics Co., Ltd., Suwon-si, Gyeonggi-do (KR)

(72) Inventors: Woo Joong Lee, Seoul (KR); Dae Ho Jeong, Hwaseong-si (KR); Sung Hwan Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 364 days.

(21) Appl. No.: 14/734,539

(22) Filed: Jun. 9, 2015

(65) Prior Publication Data

US 2015/0356112 A1 Dec. 10, 2015

(30) Foreign Application Priority Data

Jun. 9, 2014 (KR) ........................ 10-2014-0069617

(51) Int. Cl.
*G06F 17/30* (2006.01)

(52) U.S. Cl.
CPC .............................. *G06F 17/30174* (2013.01)

(58) Field of Classification Search
CPC ..................... G06F 17/30174; G06F 17/30227
USPC ........................................................ 707/625
See application file for complete search history.

(56) References Cited

U.S. PATENT DOCUMENTS

| | | | | |
|---|---|---|---|---|
| 6,067,599 A * | 5/2000 | Kishi | ................. | G06F 12/0804 707/999.202 |
| 6,412,042 B1 * | 6/2002 | Paterson | ................ | G11B 5/012 711/112 |
| 6,523,102 B1 * | 2/2003 | Dye | ...................... | G06F 12/023 709/247 |
| 7,386,664 B1 * | 6/2008 | Roy | .................... | G06F 11/2082 711/114 |
| 8,315,973 B1 * | 11/2012 | Kaiser | .................. | G06F 3/0617 707/609 |
| 8,615,496 B2 | 12/2013 | Giampaolo | | |
| 8,762,347 B1 * | 6/2014 | Gokhale | ........... | G06F 17/30227 707/649 |
| 2002/0093691 A1 * | 7/2002 | Durrant | ............ | G06F 17/30309 358/404 |
| 2006/0230175 A1 * | 10/2006 | de Vries | ............ | H04L 29/06027 709/231 |
| 2006/0282618 A1 * | 12/2006 | Thompson | .......... | G06F 12/0804 711/118 |
| 2007/0168405 A1 * | 7/2007 | Pomerantz | ............ | G06F 3/0611 |
| 2008/0222152 A1 * | 9/2008 | Godbole | .......... | G06F 17/30067 |
| 2009/0106758 A1 | 4/2009 | Giampaolo | | |
| 2012/0047342 A1 * | 2/2012 | Grusy | ................. | G06F 12/0804 711/163 |
| 2012/0173595 A1 * | 7/2012 | Salters | ............. | G06F 17/30227 707/822 |
| 2012/0179730 A1 * | 7/2012 | Slegers | ............ | G06F 17/30227 707/822 |

(Continued)

*Primary Examiner* — Thanh-Ha Dang
(74) *Attorney, Agent, or Firm* — Jefferson IP Law, LLP

(57) ABSTRACT

An electronic device is provided. The electronic device includes a memory configured to store a file, a storage configured to support journaling of the file stored in the memory, and a data processing module configured to process a journaling method of the file in one mode of a writeback mode and an ordered mode in correspondence to at least one of a property of an application relating to the file and a property of the file.

18 Claims, 8 Drawing Sheets

(56) References Cited

U.S. PATENT DOCUMENTS

| | | | |
|---|---|---|---|
| 2013/0326114 A1* | 12/2013 | Goss | G06F 12/0246 |
| | | | 711/103 |
| 2013/0326115 A1* | 12/2013 | Goss | G06F 3/0641 |
| | | | 711/103 |
| 2014/0006362 A1 | 1/2014 | Noronha et al. | |
| 2015/0170145 A1* | 6/2015 | Patel | G06F 8/20 |
| | | | 705/44 |
| 2015/0178702 A1* | 6/2015 | Patel | G06Q 20/18 |
| | | | 705/21 |
| 2015/0379036 A1* | 12/2015 | Shin | G06F 17/30227 |
| | | | 707/624 |

\* cited by examiner

METHOD AND ELECTRONIC DEVICE FOR PROCESSING DATA

CROSS-REFERENCE TO RELATED APPLICATION(S)

This application claims the benefit under 35 U.S.C. § 119(a) of a Korean patent application filed on Jun. 9, 2014 in the Korean Intellectual Property Office and assigned Serial number 10-2014-0069617, the entire disclosure of which is hereby incorporated by reference.

TECHNICAL FIELD

The present disclosure relates to data processing. More particularly, the present disclosure relates to an apparatus and method for processing data to minimize a delay due to data store processing.

BACKGROUND

Electronic devices such as smartphones and tablets provide various useful functions through several various applications. Such electronic devices may generate or update various data according to function performances.

In this regard, processes receiving user inputs and performing screen processing may read data from storage devices or perform creation and updating operations, which are defined as foreground tasks. When copying large files or downloading files from a web browser through an explorer, data processing tasks are executed as background tasks regardless of screen processing. Journaling file systems that are typically executed in data processing tasks store a file by transaction unit and accordingly, when a file created in a foreground task and large file update in a background task are processed through the same transaction, there may be a delay in the foreground task. As mentioned above, during screen application or memory storing operations of created data or updated data, if an amount of data is large, there may be a delay in storing it in a memory. Accordingly, a user may be inconvenienced by a delay due to a data storing process while using an electronic device.

The above information is presented as background information only to assist with an understanding of the present disclosure. No determination has been made, and no assertion is made, as to whether any of the above might be applicable as prior art with regard to the present disclosure.

SUMMARY

Embodiments of the present disclosure are to address at least the above-mentioned problems and/or disadvantages and to provide at least the advantages described below. Accordingly, an embodiment of the present disclosure is to provide a method and electronic device for processing data to minimize a delay due to data store processing.

Another embodiment of the present disclosure is to provide a method and electronic device for processing data to provide the integrity of stored data in a predetermined level while minimizing a delay of data store processing.

In accordance with an embodiment of the present disclosure, an electronic device is provided. The electronic device includes a memory configured to store a file, a storage configured to support journaling of the file stored in the memory, and a data processing module configured to process a journaling method of the file in one mode of a writeback mode and an ordered mode in correspondence to at least one of a property of an application relating to the file and a property of the file.

In accordance with another embodiment of the present disclosure, a data processing method is provided. The data processing method includes checking at least one of a property of a file related application stored in a memory and a property of the file, determining a journaling method of the file as one mode of a writeback mode and an ordered mode in correspondence to at least one of the property of the application the and the property of the file, and storing the file in a storage according to the determined journaling method.

In accordance with another embodiment of the present disclosure, a computer-readable storage media where an instruction is stored in a form of a programming module is provided. The instruction includes checking at least one of a property of a file related application and a property of the file stored in a memory, and storing the file in a storage by determining a journaling method of the file as one of a writeback mode and an ordered mode in correspondence to the checked property.

Other embodiments, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other embodiments, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
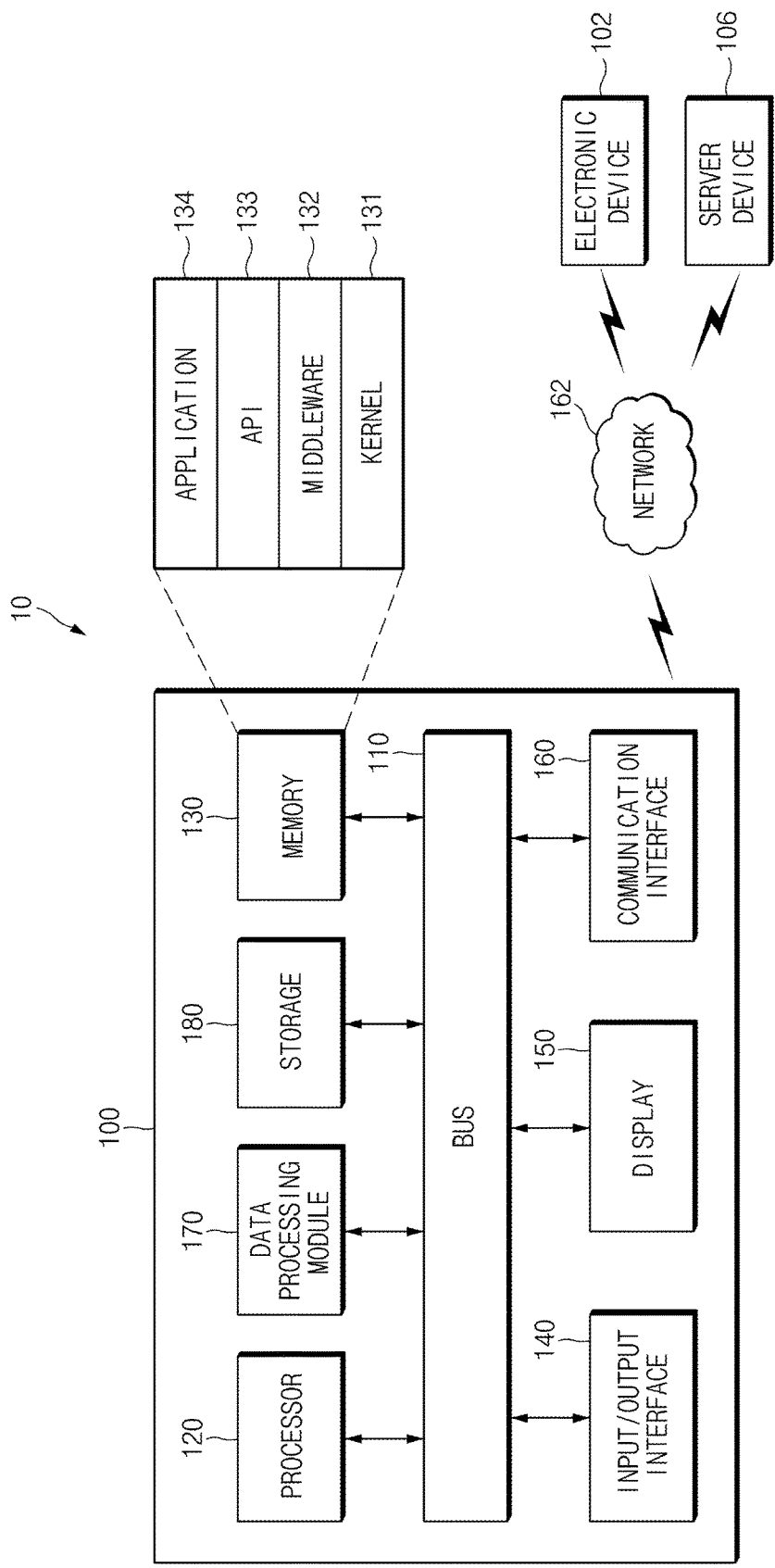
FIG. 1 is a view illustrating an electronic device related system performing data saving according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "include", "comprise", "contain" and "have", or "may include", or "may comprise", "may contain" and "may have" used herein indicate disclosed functions, operations, or existence of elements but does not exclude other functions, operations or elements. Additionally, in various embodiments of the present disclosure, the terms "include", "comprise", "including", "contain" or "comprising", specifies a property, a region, a fixed number, an operation, a process, an element and/or a component but does not exclude other properties, regions, fixed numbers, operations, processes, elements and/or components.

In various embodiments of the present disclosure, the expression "A or B" or "at least one of A or/and B" may include all possible combinations of items listed together. For instance, the expression "A or B", or "at least one of A or/and B" may indicate include A, B, or both A and B.

The terms such as "1st", "2nd", "first", "second", and the like used herein may refer to modifying various different elements of various embodiments of the present disclosure, but do not limit the elements. For instance, such expressions do not limit the order and/or importance of corresponding components. The expressions may be used to distinguish one element from another element. For instance, both "a first user device" and "a second user device" indicate a user device but indicate different user devices from each other. For example, a first component may be referred to as a second component and vice versa without departing from the scope of the present disclosure.

In this disclosure below, when one part (or element, device, etc.) is referred to as being "connected" to another part (or element, device, etc.), it should be understood that the former can be "directly connected" to the latter, or "connected" to the latter via an intervening part (or element, device, etc.). In contrast, when an element is referred to as being "directly connected" or "directly coupled" to another element, there are no intervening elements present.

In various embodiments of the present disclosure, terms used in this specification are used to describe specific embodiments, and are not intended to limit the scope of the present disclosure. The terms of a singular form may include plural forms unless they have a clearly different meaning in the context.

Unless otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning.

Additionally, an electronic device according to various embodiments of the present disclosure may be a device with a data storing function. For instance, electronic devices may include at least one of smartphones, tablet personal computers (PCs), mobile phones, video phones, electronic book (e-book) readers, desktop PCs, laptop PCs, netbook computers, personal digital assistants (PDAs), portable multimedia player (PMPs), MP3 players, mobile medical devices, cameras, and wearable devices (for example, head-mounted-devices (HMDs) such as electronic glasses, electronic apparel, electronic bracelets, electronic necklaces, electronic appcessories, electronic tattoos, and smart watches).

According to various embodiments of the present disclosure, an electronic device may be smart home appliances having a data storing function The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (for example, Samsung HomeSync™, Apple TV™ or Google TV™), game consoles, electronic dictionaries, electronic keys, camcorders, and electronic picture frames.

According to various embodiments of the present disclosure, an electronic device may include at least one of various medical devices (for example, magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, vehicle head modules, industrial or household robots, financial institutions' automatic teller machines (ATMs), and stores' point of sales (POS).

According to various embodiments of the present disclosure, an electronic device may include at least one of furniture or buildings/structures having a data storing function, electronic boards, electronic signature receiving devices, projectors, and various measuring instruments (for example, water, electricity, gas, or radio signal measuring instruments). An electronic device according to various embodiments of the present disclosure may be one of the above-mentioned various devices or a combination thereof. Furthermore, it is apparent to those skilled in the art that an electronic device according to various embodiments of the present disclosure is not limited to the above-mentioned devices.

Hereinafter, an electronic device according to various embodiments of the present disclosure will be described in more detail with reference to the accompanying drawings. The term "user" in various embodiments of the present disclosure may refer to a person using an electronic device or a device using an electronic device (for example, an artificial intelligent electronic device).

FIG. 1 is a view illustrating an electronic device related system performing data saving according to various embodiments of the present disclosure.

Referring to FIG. 1, according to an embodiment of the present disclosure, a data store processing system 10 may include an electronic device 100, an external electronic device 102, a server device 106, and a network 162.

In the above-mentioned data store processing system 10, the network 162 may establish a communication channel between the electronic device 100 and the external electronic device 102. The network 162, for example, may include network device components relating to a mobile communication channel establishment. Alternatively, the network 162 may include network device components relating to an internet communication channel establishment. The network 162 may support data transmission/reception between the electronic device 100 and the external electronic device 102. Additionally, the network 162 may support data transmission/reception between the electronic device 100 and the server device 106.

The server device 106 may establish a communication channel with the electronic device 100 or the external electronic device 102 through the network 162. According to an embodiment of the present disclosure, the server device 106 may provide data relating to a specific application management of the electronic device 100. For example, the server device 106 may provide a server page (for example, a virtual web page provided from the server device 106 to the electronic device 100 or the external electronic device 102 as accessing the server device 106) to the electronic device 100 or the external electronic device 102. Data that the server device 106 provides to the electronic device 100 may be stored in at least one of a memory 130 and a storage 180. According to an embodiment of the present disclosure, a server page provided by the server device 106 may be temporarily stored in the memory 130. Alternatively, a server page provided by the server device 106 may be stored in the storage 180. According to various embodiments of the present disclosure, specific data (for example, data that the electronic device 100 requests for download) provided by the server device 106 may be temporarily stored in the memory 130 and then stored in the storage 180. According to various embodiments of the present disclosure, the server device 106 may provide streaming data to the electronic device 100.

The external electronic device 102 may establish a communication channel with the communication interface 160 of the electronic device 100. For example, the external electronic device 102 may establish a short range communication channel or a wired communication channel with the communication interface 160. According to an embodiment of the present disclosure, the external electronic device 102 may establish a Bluetooth (BT) communication channel or a Wi-Fi direct communication channel with the communication interface 160. Alternatively, the external electronic device 102 may establish a communication channel with the electronic device 100 through the network 162. For example, the external electronic device 102 may include a cellular communication module and may establish a mobile communication channel with the electronic device 100. Alternatively, the electronic device 102 may include a Wi-Fi communication module and may establish a Wi-Fi communication channel with the electronic device 100. The external electronic device 102 may transmit scrollable information to the electronic device 100. According to various embodiments of the present disclosure, the external electronic device 102 may transmit various data through a communication channel established with the electronic device 100. For example, the external electronic device 102 may transmit chatting message data, text message data, and multimedia data to the electronic device 100. Alternatively, the external electronic device 102 may transmit a specific file (for example, large amounts of data of more than a predetermined size, for example, picture files, document files, video files, and music files) to the electronic device 100.

The electronic device 100 may establish a communication channel with at least one of the external electronic device 102 and the server device 106. The electronic device 100 may display a screen relating to other devices establishing a communication channel. The electronic device 100 may store data received from the server device 106 or the external electronic device 102 in at least one of the memory 130 and the storage 180. Additionally, the electronic device 100 may store data generated according to a specific application execution in at least one of the memory 130 and the storage 180.

According to various embodiments of the present disclosure, the electronic device 100 may perform selective journaling by a corresponding application property (for example, background processing or foreground processing) during data storage and a file property or data property (for example, the size of a file or data, location where a file or data is stored, and a set value) relating to an application. For example, when an application execution state is processed as background processing, the electronic device 100 may store data in an ordered mode (or an ordered function). When an application execution state is processed as foreground processing, the electronic device 100 may store data in a writeback mode (or a writeback function).

The writeback mode may be a mode for committing metadata of a file system storage area to a journaling device by transaction unit and directly writing file data in a file system storage area. The writeback mode is a mode that does not wait for the update completion of a file data block in a transaction commit operation (for example, when a running transaction reaches a set time or size in a file system of the memory 130, data stored in the memory 130 is transferred to a journaling device in the area of the storage 180). Such a writeback mode does not guarantee the integrity between metadata and data but metadata itself may guarantee integrity.

An ordered mode may be a mode for writing metadata in a journaling device and waiting for file data block update completion. The ordered mode may guarantee metadata integrity and integrity between metadata and data.

Referring to FIG. 1, the electronic device 100 may include a bus 110, a processor 120, the memory 130, an input/output (I/O) interface 140, a display 150, a communication interface 160, a data processing module 170, and the storage 180.

The bus 110 may be a circuit connecting the above-mentioned components and delivering a communication (for example, a control message, an input event, and data) between the above-mentioned components. For example, the bus 110 may deliver an input signal inputted from the I/O interface 140 to at least one of the processor 120 and the data processing module 170. The bus 110 may deliver scrollable information to at least one of the display 150, the processor 120, and the data processing module 170. For example, the bus 110 may deliver data stored in the memory 130 to the storage 180. The bus 110 may deliver a control signal of the data processing module 170 to at least one of the memory 130 and the storage 180.

The processor 120, for example, may receive instructions from the above-mentioned other components (for example, the memory 130, the I/O interface 140, the display 150, the communication interface 160, and the data processing module 170) through the bus 110, interpret the received instructions, and execute calculation or data processing according to the interpreted instructions. The processor 120 may be prepared in a form including the data processing module 170 or may be prepared in a form separated from the data processing module 170. The processor 120 may be prepared in a form for controlling the memory 130 and the storage 180 on the basis of the bus 110 or directly. The processor 120 may support data store processing based on the ordered mode and writeback mode.

The memory 130 may store instructions or data received from the processor 120 or the other components (for example, the I/O interface 120, the display 140, the communication interface 160, and the data processing module 170) or generated by the processor 120 or the other components. The memory 130, for example, may include programming modules such as a kernel 131, a middleware 132, an application programming interface (API) 133, or an application 134. Each of the above-mentioned programming modules may be configured with software, firmware, hardware, or a combination of at least two thereof.

The kernel 131 may control or manage system resources (for example, the bus 110, the processor 120, the memory 130, the storage 180, and the data processing module 170) used for performing operations or functions implemented in the remaining other programming modules, for example, the middleware 132, the API 133, or the application 134. Additionally, the kernel 131 may provide an interface for performing a controlling or managing operation by accessing an individual component of the electronic device 100 from the middleware 132, the API 133, or the application 134.

The middleware 132 may serve as an intermediary role for exchanging data as the API 133 or the application 134 communicates with the kernel 131. Additionally, in relation to job requests received from the application 134, the middleware 132, for example, may perform a control (for example, scheduling or load balancing) for the job requests by using a method of assigning a priority for using a system resource (for example, the bus 110, the processor 120, the memory 130, or the data processing module 170) of the electronic device 100 to at least one application among the applications 134.

The API 133 may be an interface that the application 134 uses to control a function provided from the kernel 131 or the middleware 132. The API 133, for example, may include at least one interface or function (for example, an instruction) for file control, window control, image processing, or character control.

According to various embodiments of the present disclosure, the application 134 may include short message service (SMS)/multimedia message service (MMS) applications, e-mail applications, calendar applications, notification applications, health care applications (for example, applications for measuring exercise amount or blood glucose), or environmental information applications (for example, applications for providing pressure, humidity, or temperature information). Additionally or alternatively, the application 134 may be an application relating to information exchange between the electronic device 100 and an external electronic device (for example, the external electronic device 102). The information exchange related application, for example, may include a notification relay application for relaying specific information to the external device or a device management application for managing the external electronic device.

For example, the notification relay application may have a function for relaying to an external electronic device (for example, the external electronic device 102) notification information occurring from another application (for example, an SMS/MMS application, an e-mail application, a health care application, or an environmental information providing application) of the electronic device 100. Additionally or alternatively, the notification relay application may receive notification information from an external electronic device (for example, the external electronic device 102) and may then provide the received notification information to a user. The device management application, for example, may manage (for example, install, delete, or update) at least part of a function (turn-on/turn off of the external electronic device itself (or some components) or the brightness (or resolution) adjustment of a display) of an external electronic device (for example, the external electronic device 102) communicating with the electronic device 100, an application operating in the external electronic device, or a service (for example, call service or message service) provided from the external device. According to various embodiments of the present disclosure, when an external electronic device is an MP3 player, the application 134 may include an application relating to music playback. Similarly, when an external electronic device is a mobile medical device, the application 134 may include an application relating to heath care.

According to an embodiment of the present disclosure, data generated in relation to the application 134 according to the property or type of the application 134 may be set to be stored through a data processing method of at least one of a writeback mode and an ordered mode. For example, the application 134 relating to a web browser may be set to store data on the basis of a writeback mode. The application 134 relating to music playback may be set to store data on the basis of an ordered mode. The application 134 relating to video playback may be set to store data on the basis of an ordered mode. As another example, when the application 134 has a function for realtime processing, data generated in relation to the application 134 may be set to be stored on the basis of a writeback mode. Additionally, when the application 134 has a function for mass data processing, data generated in relation to the application 134 may be set to be stored on the basis of an ordered mode. In relation to the setting of a type specific data processing method of the application 134, the data processing module 170 may provide a setting screen. The property (for example, real-time or mass data store characteristics) of the application 134 may be determined through the execution operation (for example, background processing or foreground processing) of the application 134 in the electronic device 100 and the size check of data.

According to various embodiments of the present disclosure, the memory 130 may include a directory or file generated or updated by the application 134. The directory may include a category or folder generated in relation to the management of the application 134. The directory may include a sub directory or at least one file. A data processing method (for example, a writeback mode or an ordered mode) of the directory may be set in correspondence to a control of the data processing module 170. When the data processing method of the directory is set, a sub directory or a file disposed in the directory may be processed by inheriting a corresponding data processing method. A file may include a predetermined size or at least one data block managed in relation to a function execution.

The I/O interface 140 may deliver an instruction or data inputted from a user through an I/O device (for example, a sensor, a keyboard, or a touch screen) to the processor 120, the memory 130, the communication interface 160, or the data processing module 170 through the bus 110. Additionally, the I/O interface 140 may output, through the I/O device (for example, a speaker or a display), instructions or data received from the processor 120, the memory 130, the communication interface 160, or the data processing module 170 through the bus 110. According to various embodiments of the present disclosure, the I/O interface 140 may include a physical key button (for example, a home key, a side key, and a power key), a jog key, and a keypad. The I/O interface 140 may include a virtual keypad outputted to the display 150 as an input device. The I/O interface 140 may generate an input signal relating to at least one application execution, an input signal relating to a control of an application in execution, and an input signal relating to directory or file creation.

According to various embodiments of the present disclosure, the I/O interface 140 may perform an audio processing related function. In relation to this, the I/O interface 140 may include one or more of at least one of a speaker and a microphone. For example, the I/O interface 140 may output audio data relating to a specific application execution through a speaker according to a control of the data processing module 170.

The display 150 may display various information (for example, multimedia data or text data). For example, the display 150 may output a lock screen and a standby screen. The display 150 may output a specific function execution screen, for example, a sound source playback screen, a video playback screen, and a broadcast reception screen, in correspondence to a function execution. According to an embodiment of the present disclosure, the display 150 may output a screen relating to a data processing method setting of an application. Additionally, the display 150 may output a screen relating to a data processing method setting of a directory or a file.

The communication interface 160 may connect a communication between the electronic device 100 and an external device (for example, at least one of the external electronic device 102 and the server device 106). For example, the communication interface 160 may communicate with the external device in connection to the network 162 through wireless communication or wired communication. The wireless communication, for example, may include at least one of Wi-Fi, BT, near field communication (NFC), GPS, and cellular communication (for example, long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM)). The wired communication may include at least one of universal serial bus (USB), high definition multimedia interface (HDMI), recommended standard 232 (RS-232), and plain old telephone service (POTS), for example.

According to an embodiment of the present disclosure, the network 162 may be a telecommunications network. The telecommunications network may include at least one of a computer network, an Internet, an Internet of things, and a telephone network. According to an embodiment of the present disclosure, a protocol (for example, transport layer protocol, data link layer protocol, or physical layer protocol) for communication between the electronic device 100 and an external device may be supported by at least one of the application 134, the API 133, the middleware 132, the kernel 131, and the communication interface 160.

The communication interface 160 may include a plurality of communication modules when the electronic device 100 supports a plurality of communication methods. For example, the electronic device 100 may include a communication module capable of establishing a direct communication channel, for example, a short range communication module or a direct communication module, with the external electronic device 102. The short range communication module or the direct communication module may include at least one of various communication modules such as a Wi-Fi direct communication module, a BT communication module, and a Zigbee communication module. Additionally, the direct communication module may include a wired communication module such as cable.

According to an embodiment of the present disclosure, the communication interface 160 may receive specific data (for example, an image file, a document file, and a webpage) from at least one of the external electronic devices 102 and the server device 106. The received data may be temporarily stored in the memory 130 and may be stored in the storage according to setting. At this point, the received data may be transferred from the memory 130 to the storage 180 through any one of a writeback mode and an ordered mode according to the execution location or state or operation of a corresponding application or the size of data.

The data processing module 170 may process data obtained from other components (for example, the processor 120, the memory 130, the I/O interface 140, or the communication interface 160). For example, the data processing module 170 may perform a control to store in the memory 130 data generated in correspondence to specific application execution or specific function execution and store data stored in the memory 130 in the storage 180 according to one method of a writeback mode and an ordered mode.

Figure 2:
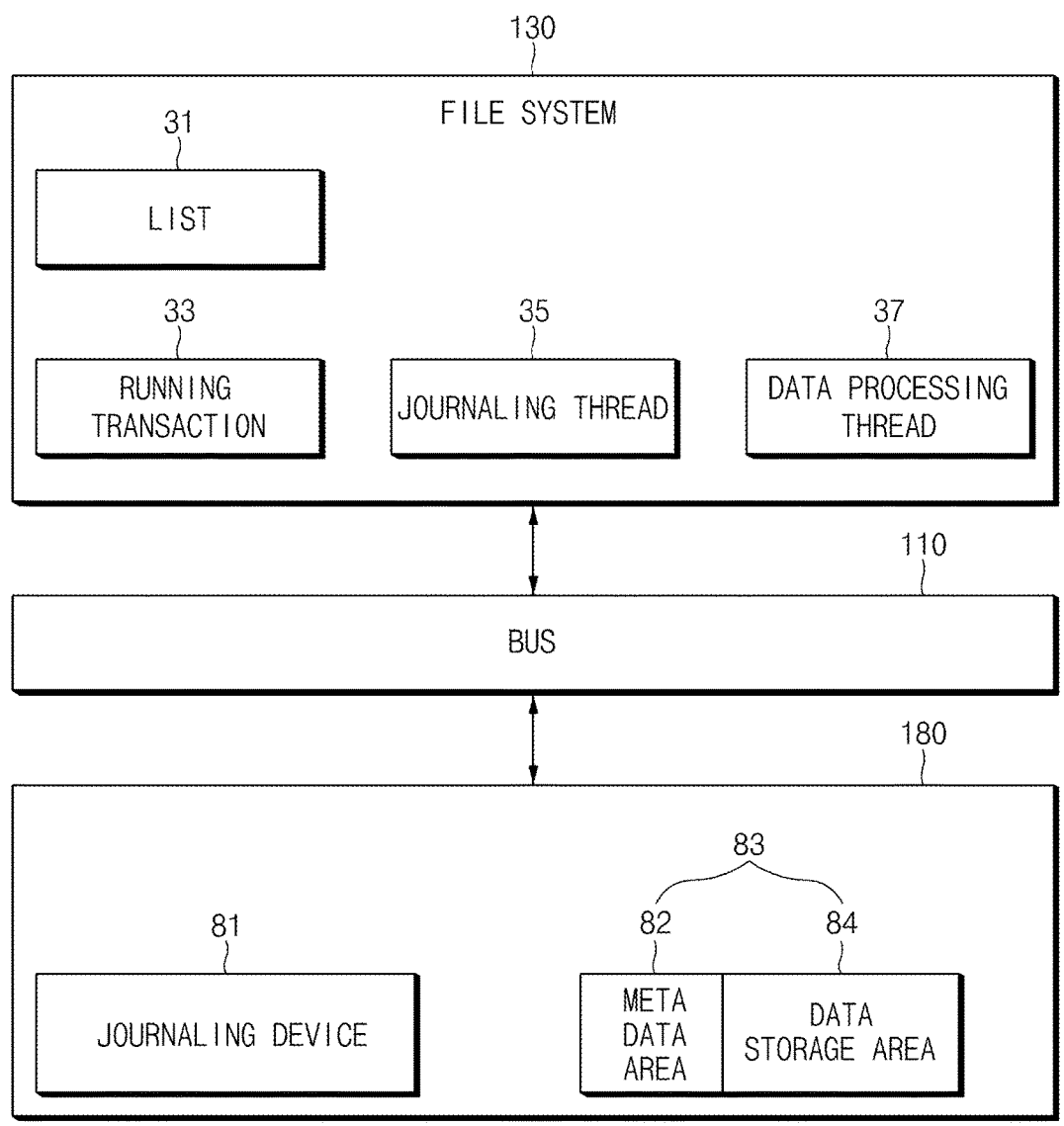
FIG. 2 is a view illustrating a storage and a memory according to various embodiments of the present disclosure.

FIG. 2 is a view illustrating a storage and a memory according to various embodiments of the present disclosure.

Referring to FIG. 2, a memory 130 includes a file system and may include a list area 31, a running transaction area 33, a journaling thread area 35, and a data processing thread area 37. The storage 180 may include a journaling device 81 and a data area 83. The data area 83 may include a metadata area 82 and a data store area 84.

When a specific file is created (or the update of a specific file is requested) in correspondence to a specific function or application execution of the electronic device 100, the data processing module 170 may perform information check relating to a corresponding file. For example, the data processing module 170 may check at least one of the size of a file, the property of a directory where a file is located, and an execution state of application. According to a check result, the data processing module 170 may determine a data processing method of a file to be stored in the storage 180. For example, when the data processing of a file relating to a background processed application is requested, the data processing module 170 may determine to process a corresponding file in an ordered mode.

According to an embodiment of the present disclosure, when file processing according to background processing corresponding to a data processing method relating to a writeback mode is requested, the data processing module 170 may suppress an additional file related node creation in the list area 31. The data processing module 170 may perform a control to store file related metadata in the running transaction area 33. The data processing module 170 may check a situation that a transaction commit timing arrives on the basis of a set time or size. When a specified transaction commit timing arrives, the data processing module 170 may perform a control to store metadata stored in the running transaction area 33 in a predetermined area of the journaling device 81 by using the bus 110. According to an embodiment of the present disclosure, a plurality of metadata blocks may be stored in the running transaction area 33 and information stored in one running transaction area 33 may be stored in a predetermined area of the journaling device 81. After storing metadata stored in the running transaction area 33 in the journaling device 81, the data processing module 170 may not wait for a write operation completion of the data area 83 and may perform another file processing. After writing metadata in the journaling device 81, the data processing module 170 may control a write operation of data blocks in the data store area 84. During this operation, the data processing module 170 may perform a control to store metadata stored in the journaling device 81 in the metadata data area 82 in relation to the data store area 84. In relation to this, the data processing module 170 may allocate a journaling thread and a data processing thread to the journaling thread area 35 and the data processing thread area 37, respectively. A journaling thread disposed in the journaling thread area 35 may control a list management operation relating to a file node, a storing operation of the journaling device 81 of metadata, and a storing operation of the metadata area 82 of metadata. A data processing thread may control an operation for storing data blocks in the data store area 84. Herein, data blocks may include information relating to a new file or a previous file update. In the case of a new file, data blocks of a file may be stored in a new area allocated from the area of the storage 180 allocated in relation to a corresponding application management. In the case of a file obtained by updating an existing file, data blocks of a file may be stored in the form of overwriting an existing stored file area.

According to various embodiments of the present disclosure, when file processing according to foreground processing corresponding to a data processing method relating to an ordered mode is requested, the data processing module 170 may create a new file node in the list area 31. The data processing module 170 may perform a control to store file related metadata in the running transaction area 33. When a transaction commit timing arrives on the basis of a set time or size, the data processing module 170 may perform a control to store metadata stored in the running transaction area 33 in a predetermined area of the journaling device 81. After storing metadata stored in the running transaction area 33 in the journaling device 81, the data processing module 170 may control a write operation of data blocks in the data store area 84. During this operation, the data processing module 170 may perform a control to store metadata stored in the journaling device 81 in the metadata data area 82 in relation to the data store area 84. When metadata and data block writes are completed in the metadata area 82 and the data store area 84, respectively, the data processing module 170 may control the next operation progress. In the above operation, the data processing module 170 may control journaling thread allocation and management in the journaling thread area 35 in relation to metadata write. Additionally, the data processing module 170 may control data processing thread allocation and management in the data processing thread area 37 in relation to data block write.

Figure 3:
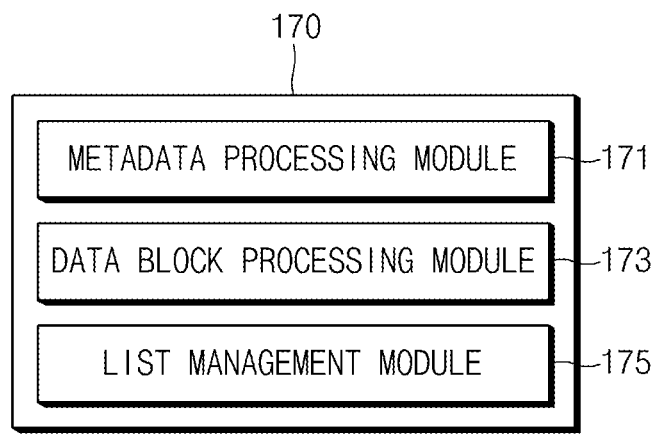
FIG. 3 is a view illustrating a data processing module of an electronic device according to various embodiments of the present disclosure.

FIG. 3 is a view illustrating a data processing module of an electronic device according to various embodiments of the present disclosure.

Referring to FIG. 3, the data processing module 170 may include a metadata processing module 171, a data block processing module 173, and a list management module 175.

The metadata processing module 171 may perform metadata processing of data generated according to management of the electronic device 100. For example, when a specified file is created or an update related file is created in correspondence to management of the electronic device 100, the metadata processing module 171 may control a generation operation for generating metadata relating to a corresponding file, a storing operation for storing metadata in the memory 130, and a transfer operation for transferring metadata stored in the memory 130 to the storage 180. The metadata may include meta information relating to a file. For example, the metadata may include type information of an application relating to a corresponding file, the storage location (for example, a file root) of a file, the size of a file, and a file creation time. When metadata is generated, the metadata processing module 171 may perform a control to store the generated metadata in the running transaction area 33 of the memory 130. The metadata processing module 171 may perform a control to store metadata in the journaling device 81 of the storage 180 during a transaction. During this operation, the metadata processing module 171 may check a data processing method including at least one of the property of an application relating to a corresponding file, a location or state where an application is executed, and the property of a file or a directory where a file is located. The metadata processing module 171 may control a storing operation of the storage 180 for metadata through at least one mode of a writeback mode and an ordered mode according to the checked data processing method.

For example, when performing a control to store metadata in the storage 180 according to a writeback mode, the metadata processing module 171 may process an operation for storing metadata (herein, the metadata may include a plurality of metadata blocks) stored in the memory 130 in a journaling device (for example, the journaling device 81 of FIG. 2) separately from or in parallel to a file related data block storing operation. Alternatively, when performing a control to store metadata in the storage 180, the metadata processing module 171 may process a metadata storing operation in relation to a data block storing operation. For example, after storing metadata stored in the memory 130 in the journaling device of the storage 180 in an ordered mode method, the metadata processing module 171 may process an operation for storing metadata in a metadata area in the data area of the storage 180. When the data block storing operation is completed in relation to the metadata storing operation, the metadata processing module 171 may perform another metadata storing operation.

The data block processing module 173 may process generated data according to management of the electronic device 100. For example, when a specified file is created or an update related file is created in correspondence to management of the electronic device 100, the data block processing module 173 may control a storing operation of the memory 130 for a corresponding file related data block and a transferring operation of the storage 180 for a data block stored in the memory 130. During this operation, the data block processing module 173 checks a data processing method and may process a storing operation of a data block according to the checked method (for example, a writeback mode or an ordered mode).

The list management module 175 may process a node list management relating to metadata store. For example, when a specific file storing operation is requested (for example, a file system instruction is generated by an I/O control (ioctl) system call relating to a file storage in correspondence to an application execution), the list management module 175 may perform a node list management. According to an embodiment of the present disclosure, the list management module 175 may perform a list update including a new node (for example, a list item) in relation to a file to be stored in an ordered mode. Additionally, the list management module 175 may perform a control not to create an additional node in relation to a file to be stored in a writeback mode.

Moreover, although it is described in the above that the metadata processing module 171, the block processing module 173, and the list management module 175 are divided by each role, various embodiments of the present disclosure are not limited thereto. For example, the data processing module 170 may allocate one processing module for processing a list management operation according to a writeback mode or an ordered mode in relation to specific file processing, a storing operation of metadata, and a data block storing operation. The allocated one processing module may process the list management operation according to a writeback mode or an ordered mode, the storing operation of metadata, and the data block storing operation as one process according to a writeback mode or an ordered mode. Additionally, the data processing module 170 may allocate a process or process module for processing a metadata storing operation and a list management operation together. In this case, one processing module may process a list management operation and a metadata storing operation and another processing module may process a data block storing operation.

As mentioned above, an electronic device according to various embodiments of the present disclosure may include a memory for storing a file according to a device management, a storage for supporting the journaling of a file stored in the memory, and a data processing module for processing the journaling method of the file in at least one mode of a writeback mode and an ordered mode in correspondence to at least one of the property of the file related application and the property of the file.

According to various embodiments of the present disclosure, when the application execution operation is foreground processing, the data processing module may perform a control to store the file in a writeback mode.

According to various embodiments of the present disclosure, when the application execution operation is background processing, the data processing module may perform a control to store the file in an ordered mode.

According to various embodiments of the present disclosure, when the application execution operation is background processing, the data processing module may perform a control to store the file in any one of a writeback mode or an ordered mode.

According to various embodiments of the present disclosure, when the size of the file is equal to or greater than a specified size, the data processing module may process the file in a writeback mode.

According to various embodiments of the present disclosure, when the size of the file is less than a specified size, the data processing module may process the file in an ordered mode.

According to various embodiments of the present disclosure, when writeback mode processing is determined by the property of the application, the data processing module may perform the variable definition and setup relating to writeback mode flag processing on a file node.

According to various embodiments of the present disclosure, the data processing module may check a directory property at the location where the file is stored and when the directory property is a writeback mode setting, may inherit this to determine the property of the file as writeback mode processing.

According to various embodiments of the present disclosure, when the application execution operation is background processing, the data processing module may check the size of the file and when the size of the file is greater than a specified value, may process the file in a writeback mode.

According to various embodiments of the present disclosure, when the application execution operation is background processing, the data processing module may check the size of the file and when the size of the file is less than a specified value, may process the file in an ordered mode.

Figure 4:
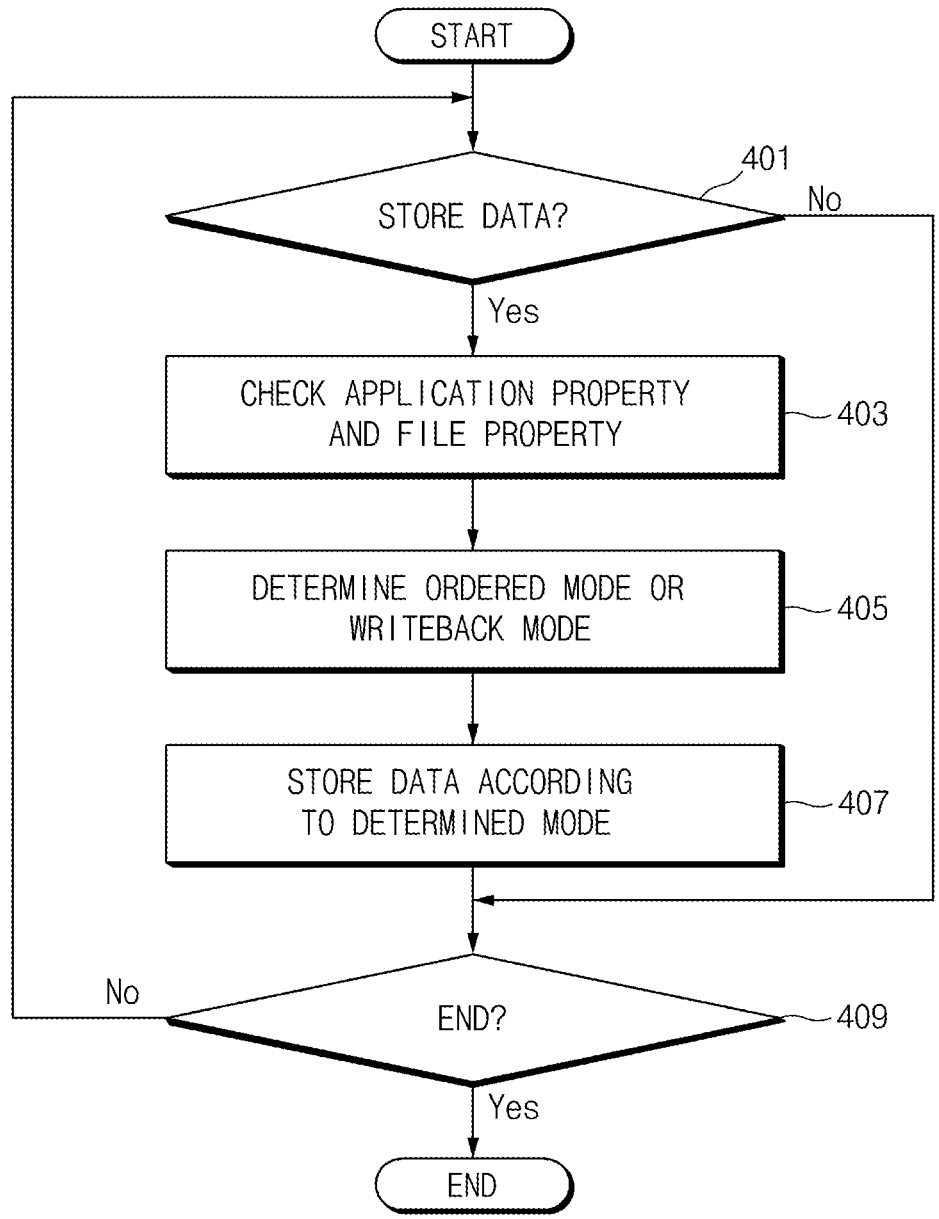
FIG. 4 is a view illustrating a data processing method according to various embodiments of the present disclosure.

FIG. 4 is a flowchart illustrating a data processing method according to various embodiments of the present disclosure.

Referring to FIG. 4, in relation to a data processing method according to various embodiments of the present disclosure, the data processing module 170 may check whether there is an event occurrence relating to data store in operation 401. For example, the data processing module 170 may check whether there is file creation or file update according to a specific application execution. The specific application execution may include various functions supported by the electronic device 100, for example, a message function, a messenger function, a schedule function, a file editing function, an image collecting function, and a data transmitting/receiving function. If there is no data store related event occurrence in operation 401, the data processing module 170 may skip the subsequent processes and may branch into operation 409.

If there is a data store related event occurrence in operation 401, the data processing module 170 may check at least one of an application property and a file property in operation 403. For example, the data processing module 170 may check whether an application execution is performed as background processing or foreground processing, the directory property (for example, a property set to perform data processing according to a writeback mode or an ordered mode) at the position where a file is stored, and the size (for example, whether a file is greater than a specified size) of a file. Alternatively, the data processing module 170 may check whether a setting property relating to data processing of an application is a write mode or an order mode. Alternatively, the data processing module 170 may check the property (for example, the property (for example, a relation to a protocol management requesting realtime processing processed in a writeback mode processing method and a relation to a download type protocol management processed in an ordered mode processing method) of a task, a process, or a thread processed during an application execution) of a specific routine during an application execution relation to an application property.

In operation 405, the data processing module 170 may determine a processing method of a corresponding file as one of an ordered mode and a writeback mode in correspondence to a check result. In operation 407, the data processing module 170 may control data store processing according to the determined mode. In the data store processing method, the data processing module 170 may manage a journaling method. The journaling method may be a method of preventing file system damage during file I/O. The journaling method may be a method of committing (for example, placing metadata in the running transaction area 33) metadata to be changed in a journal area (for example, the journaling device 81) by transaction unit before updating a file system and updating the file system when the commit is completed. The transaction commit may be performed according to a sync time or specified transaction commit period of a file included in a transaction or a placement of the amount of metadata of a specified size.

In operation 409, the data processing module 170 may check whether an event (for example, a turn-off event of the electronic device 100 or a termination event of an application relating to file processing of the electronic device 100) relating to the termination of a data store related operation occurs. If there is no event occurrence relating to an operation termination, the data processing module 170 may branch into operation 401 and control the re-performance of the subsequent processes.

According to various embodiments of the present disclosure, on the basis of the above operation, the data processing module 170 may prevent the file I/O of foreground processing from being delayed by a file I/O during a background processing process. According to an embodiment of the present disclosure, when the file system journaling device 81 operates in an ordered mode, the data processing module 170 registers the node of a file in relation to a management of the running transaction area 33 and may support the data block of a file node to be referenced at the transaction commit timing. Additionally, when the file system journaling device 81 operates in a writeback mode, the data processing module 170 may perform transaction commit without waiting for that the data block of a file node is stored in the storage 180 at the transaction commit timing.

In relation to a selective writeback mode application through directory and file property specification, the data processing module 170 may perform the variable definition and setup for processing a writeback mode flag processing in the file node of a list. Herein, the data processing module 170 may allocate an area for storing a flag relating to a writeback mode performance in a file node. When a file system instruction (for example, ioctl system call) occurs by an application, the data processing module 170 may perform a flag setup in a directory or file node that requires a writeback mode. When a writeback flag is set up in a directory (or a directory inode), the data processing module 170 may set up a file (or a file inode) created newly in a directory to inherit a writeback mode flag of a parent directory. When a writeback mode flag is set up in a node during an operation for registering the changed contents of a file node in the running transaction area 33, the data processing module 170 writes only the changed metadata buffer in the running transaction area 33 and omits a node registration process (for example, a list management operation), thereby processing to perform writeback mode journaling at the transaction commit timing later.

Figure 5:
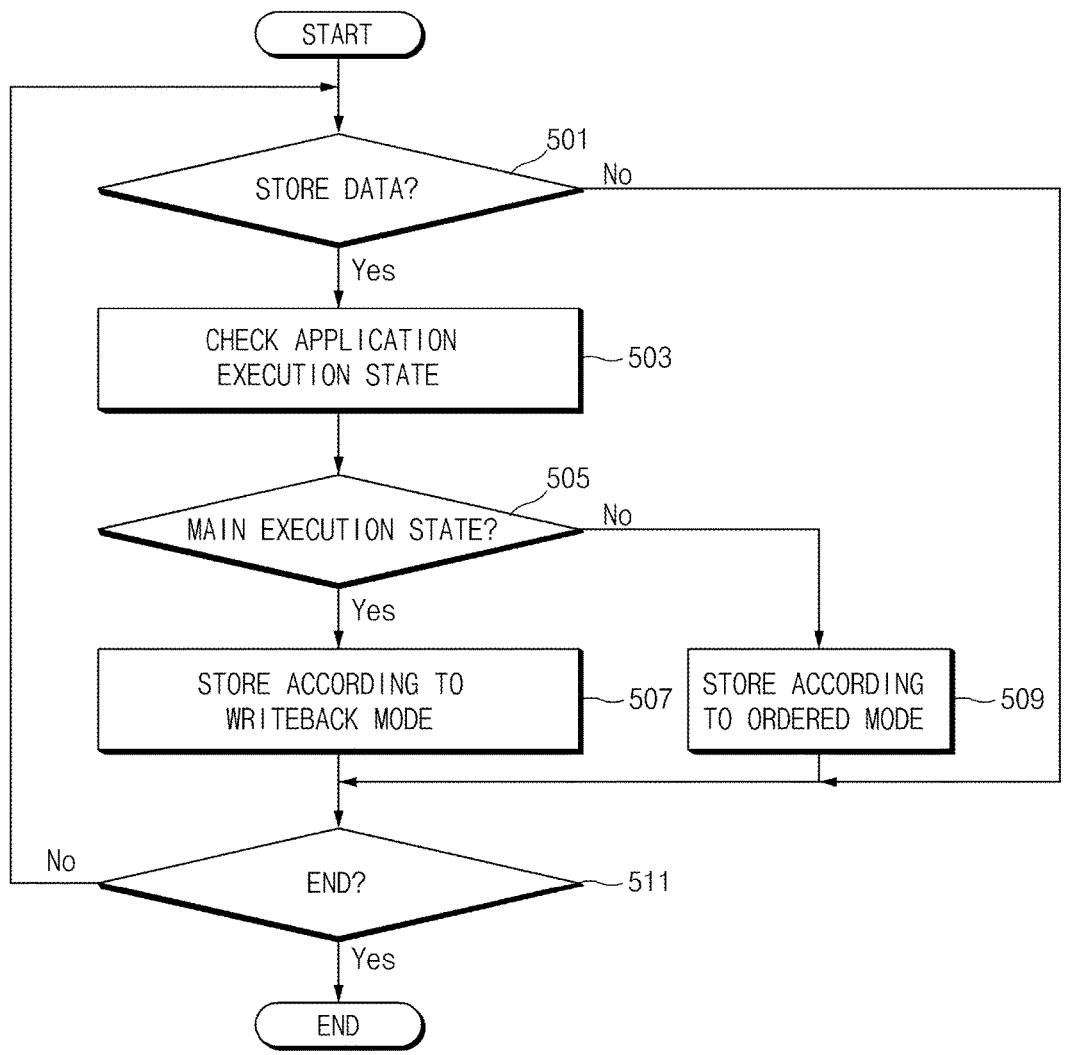
FIG. 5 is a flowchart illustrating data processing according to an application execution state in a data processing method according to various embodiments of the present disclosure.

FIG. 5 is a flowchart illustrating data processing according to an application execution state in a data processing method according to various embodiments of the present disclosure.

Referring to FIG. 5, in relation to the data processing method, the data processing module 170 may check whether there is an event occurrence relating to data store in operation 501. If there is no event occurrence relating to data store in operation 501, the data processing module 170 may perform a control to skip the subsequent processes and branch into operation 511. If there is an event occurrence relating to data store in operation 501, the data processing module 170 may perform an application execution state check in operation 503.

In operation 505, the data processing module 170 may check whether an application execution state is a specified state, for example, a main execution state (for example, a state in which a screen relating to a corresponding application is disposed on foreground, a state allocated to allow information to be inputted to a corresponding application, and a state allocated to output an audio of a corresponding application). When the application execution state is the specified state in operation 505, the data processing module 170 may perform data store processing according to a writeback mode in operation 507. When the application execution state is not the specified state (for example, when an application execution is in a background processing state, when an information input of a corresponding application among a plurality of execution applications is not allocated, and when an audio output of a corresponding application among a plurality of execution applications is not allocated) in operation 505, the data processing module 170 may control data store processing according to an ordered mode in operation 509.

Once the data storing operation is completed, the data processing module 170 may check whether an operation relating to data store is terminated in operation 511. If there is no event relating to the termination of a data storing operation, the data processing module 170 branches into operation 501 to perform the subsequent processes again.

As mentioned above, in relation to a selective writeback mode application through process property specification, the data processing module 170 may process a variable specification for specifying a foreground processing or background processing property to a process management structure. For example, when a file node or a data block is changed through a system call in process context, if a process for performing the system call is a background processing property, the data processing module 170 may perform a writeback mode flag setup on the file node. Additionally or alternatively, when a writeback mode flag of a file node is set up and the data size of a file node is greater than a specified value during an operation for registering the changed contents of a file node in the running transaction area 33, the data processing module 170 may perform data processing according to a writeback mode.

Figure 6:
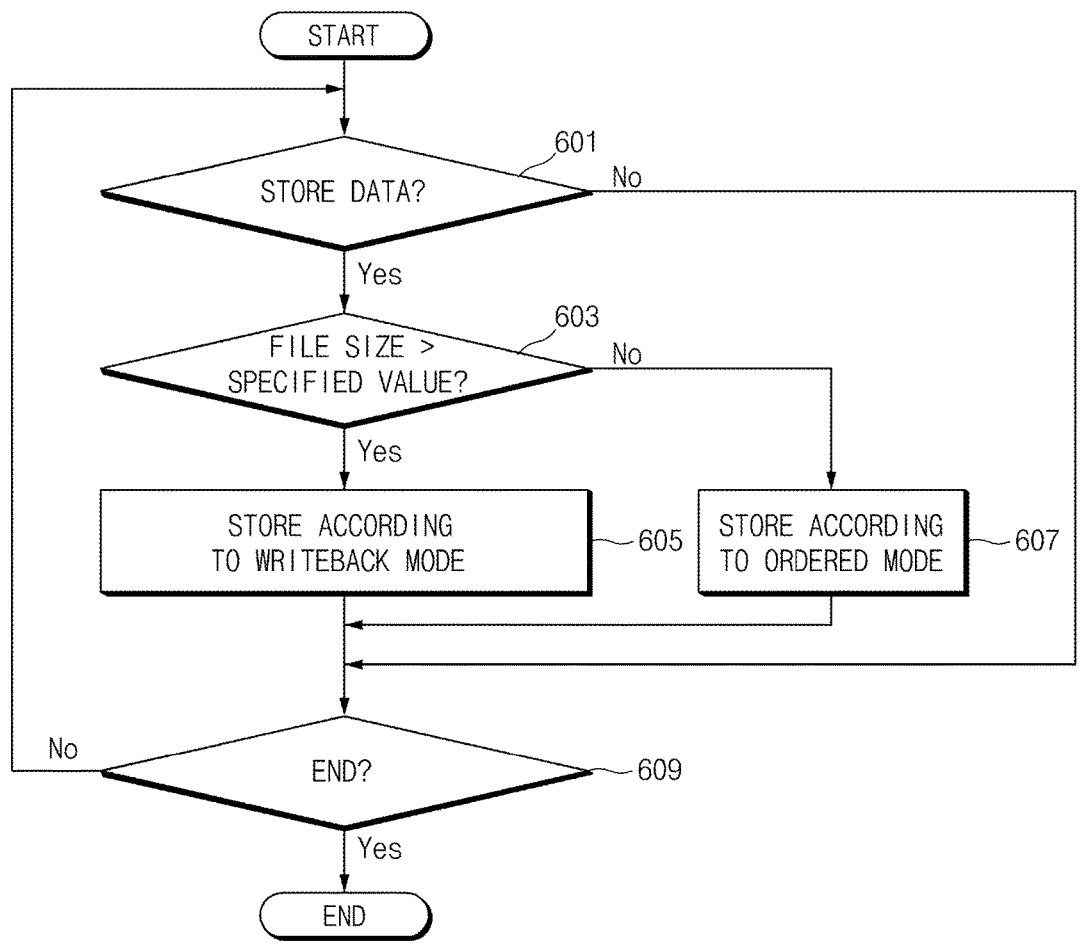
FIG. 6 is a flowchart illustrating processing according to a file size in a data processing method according to various embodiments of the present disclosure.

FIG. 6 is a flowchart illustrating processing according to a file size in a data processing method according to various embodiments of the present disclosure.

Referring to FIG. 6, in relation to the data processing method, the data processing module 170 may check whether there is a data store related event in operation 601. If there is no data store related event occurrence in operation 601, the data processing module 170 may branch into operation 609.

When a data store related event occurs in operation 601, the data processing module 170 may check whether the size of a file to be processed for storage is greater than a specified value in operation 603. When the size of a file to be processed for storage is greater than the specified value, the data processing module 170 may perform a control to process and store the file according to a writeback mode in operation 605. When the size of a file to be processed for storage is less than the specified value (or smaller than the specified value), the data processing module 170 may perform a control to process and store the file according to an ordered mode in operation 607.

Once the data store processing is completed, the data processing module 170 may check whether an event relating to data store termination occurs in operation 609. If there is no data store termination related event, the data processing module 170 branches into operation 601 to perform the subsequent processes again.

As mentioned above, a data processing method according to various embodiments of the present disclosure may process to prevent a delay due to file processing by performing a writeback mode or an ordered mode according to the size of a file.

As mentioned above, a data processing method according to various embodiments of the present disclosure may include storing a file according to a device management in a memory, and storing and processing the file by determining a journaling method of the file as any one of a writeback mode and an ordered mode in correspondence to at least one of the property of an application relating to a file stored in the memory and the property of the file.

According to various embodiments of the present disclosure, when the application execution operation is foreground processing, the processing of the file may include storing the file according to a writeback mode.

According to various embodiments of the present disclosure, when the application execution operation is background processing, the processing of the file may include storing the file according to an ordered mode.

According to various embodiments of the present disclosure, the processing of the file may include storing the file as any one of a writeback mode and an ordered mode according to the size of the file.

According to various embodiments of the present disclosure, when the size of the file is greater than a specified size, the storing of the file may include processing the file in a writeback mode.

According to various embodiments of the present disclosure, when the size of the file is less than a specified size, the storing of the file may include processing the file in an ordered mode.

According to various embodiments of the present disclosure, when writeback mode processing is determined by the property of the application, the processing of the file may include performing the variable definition and setup relating to writeback mode flag processing on a file node.

According to various embodiments of the present disclosure, the processing of the file may include checking a directory property at the location where the file is stored and when the directory property is a writeback mode setting, inheriting this to process the property of the file in a writeback mode.

According to various embodiments of the present disclosure, when the application execution operation is background processing, the processing of the file may include checking the size of the file and when the size of the file is greater than a specified value, processing the file in a writeback mode.

According to various embodiments of the present disclosure, when the application execution operation is background processing, the processing of the file may include checking the size of the file and when the size of the file is less than a specified value, processing the file in an ordered mode.

Figure 7:
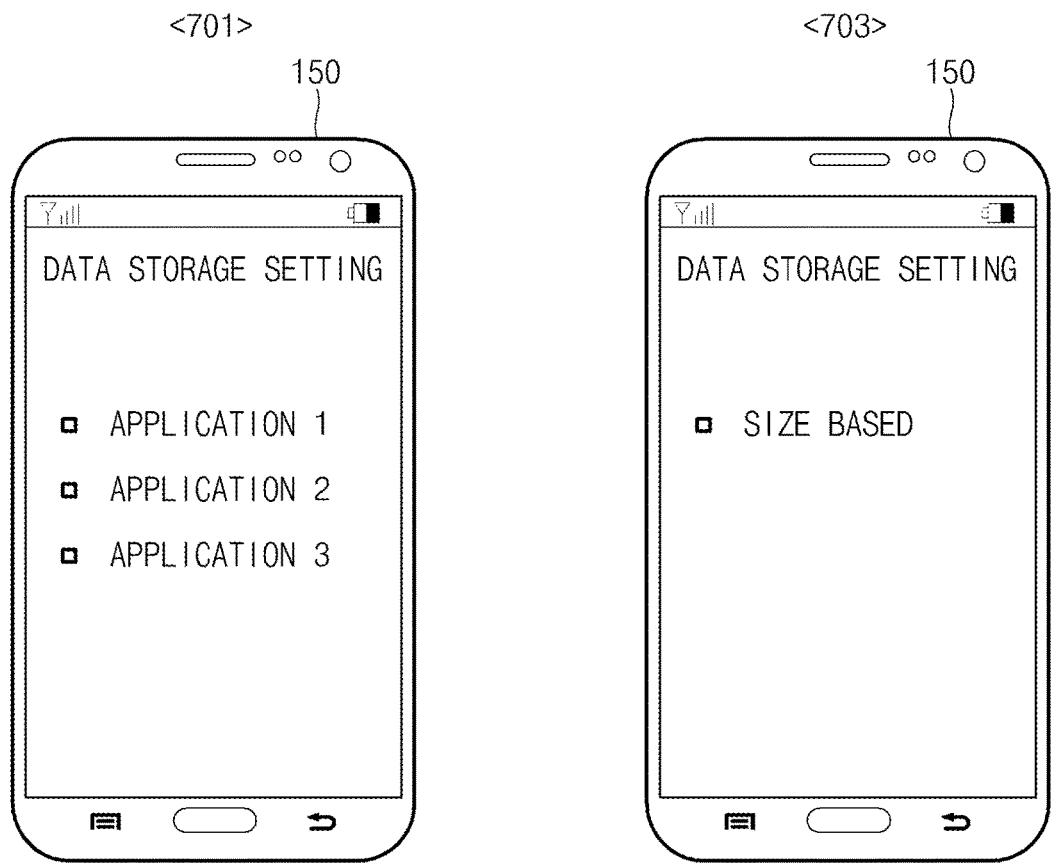
FIG. 7 is a view illustrating an interface of an electronic device relating to data store processing according to various embodiments of the present disclosure.

FIG. 7 is a view illustrating an interface of an electronic device relating to data store processing according to various embodiments of the present disclosure.

Referring to FIG. 7, the data processing module 170 of the electronic device 100 may perform a control to output a screen relating to a data store setting to the display 150. For example, the data processing module 170 may provide at least one of a menu item or icon for performing an application specific data store setting and a menu item or icon for performing a data size specific data store setting. When an input signal relating to an application specific data store setting occurs, the data processing module 170 may provide an application specific data store setting available screen to the display 150 as shown in a state 701. The data processing module 170 may provide at least one application item installed on the electronic device 100. Alternatively, the data processing module 170 may provide data generation related routines supported by a specific application as items.

According to an embodiment of the present disclosure, when a specific item is selected, the data processing module 170 may perform a control to process a file by an application corresponding to the selected item in a writeback mode or an ordered mode. According to an embodiment of the present disclosure, the data processing module 170 may perform a control to process the application related file in an ordered mode while the application of the selected item operates as background processing and process the application related file in a writeback mode while the application of the selected item operates as foreground processing. According to various embodiments of the present disclosure, even when the application of the selected item operates as background processing, the data processing module 170 may perform a control to process a related file in a writeback mode. In relation to the above-mentioned processing method setting, the data processing module 170 may provide guide information (for example, information on the time at which a related file of a selected item is processed in a writeback mode or an ordered mode) during item setting.

When an input signal relating to a size specific data store setting occurs, the data processing module 170 may provide a size specific data store setting available screen to the display 150 as shown in a state 703. When a corresponding item is selected from the size specific data store setting available screen, the data processing module 170 may perform a control to process an application related file in a writeback mode. According to various embodiments of the present disclosure, when a specific application is selected in a state 701, the data processing module 170 may support an additional setting for data size specific storage processing to be available in a screen 703.

Figure 8:
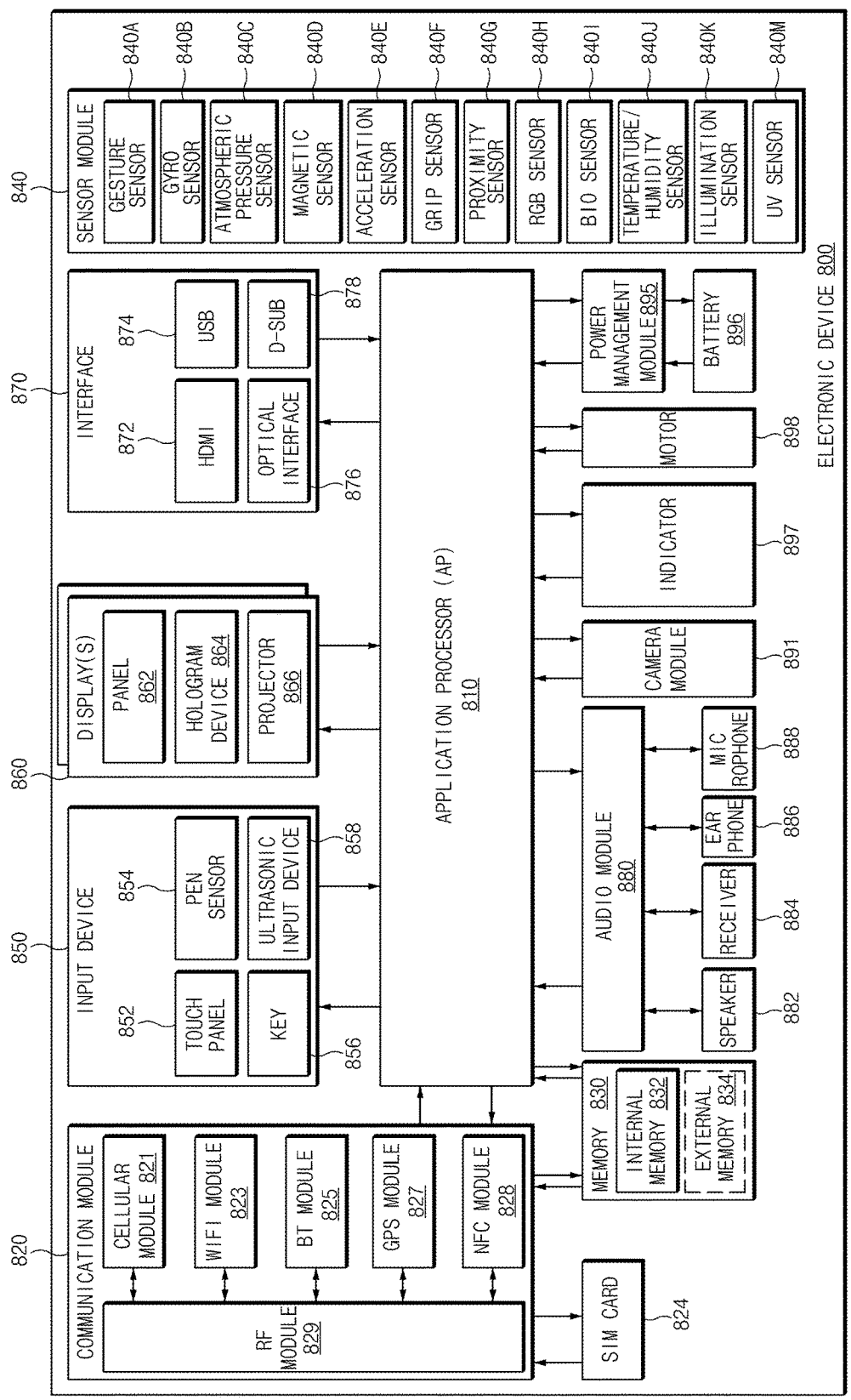
FIG. 8 is a block diagram of an electronic device according to various embodiments of the present disclosure.

FIG. 8 is a block diagram of an electronic device according to various embodiments of the present disclosure.

Referring to FIG. 8, the electronic device 800, for example, may configure all or part of the above-mentioned electronic device 100 shown in FIG. 1.

Referring to FIG. 8, the electronic device 800 includes at least one application processor (AP) 810 (for example, the processor 120 and the data processing module 170), a communication module 820 (for example, the communication interface 160), a subscriber identification module (SIM) card 824, a memory 830 (for example, the memory 130 and the storage 180), a sensor module 840, an input device 850, a display 860 (for example, the displays 150), an interface 870 (for example, the I/O interface 140), an audio module 880, a camera module 891, a power management module 895, a battery 896, an indicator 897, and a motor 898.

The AP 810 may control a plurality of hardware or software components connected to the AP 810 and also may perform various data processing and operations with multimedia data by executing an operating system or an application program. The AP 810 may be implemented with a system on chip (SoC), for example. According to an embodiment of the present disclosure, the AP 810 may further include a graphic processing unit (GPU) (not shown).

The communication module 820 (for example, the communication interface 160) may perform data transmission/reception through a communication between other electronic devices (for example, the external electronic device 102 and the server device 106) connected to the electronic device 800 (for example, the electronic device 100) via a network. According to an embodiment of the present disclosure, the communication module 820 may include a cellular module 821, a Wi-Fi module 823, a BT module 825, a GPS module 827, an NFC module 828, and a radio frequency (RF) module 829.

The cellular module 821 may provide voice calls, video calls, text services, or internet services through a communication network (for example, LTE, LTE-A, CDMA, WCDMA, UMTS, WiBro, or GSM). The cellular module 821 may perform a distinction and authentication operation on an electronic device in a communication network by using a SIM (for example, the SIM card 824), for example. According to an embodiment of the present disclosure, the cellular module 821 may perform at least part of a function that the AP 810 provides. For example, the cellular module 821 may perform at least part of a multimedia control function.

According to an embodiment of the present disclosure, the cellular module 821 may further include a communication processor (CP). Additionally, the cellular module 821 may be implemented with SoC, for example. As shown in FIG. 8, components such as the cellular module 821 (for example, a CP), the memory 830, or the power management module 895 are separated from the AP 810, but according to an embodiment of the present disclosure, the AP 810 may be implemented including some of the above-mentioned components (for example, the cellular module 821).

According to an embodiment of the present disclosure, the AP 810 or the cellular module 821 (for example, a CP) may load instructions or data, which are received from a nonvolatile memory or at least one of other components connected thereto, into a volatile memory and then may process them. Furthermore, the AP 810 or the cellular module 821 may store data received from or generated by at least one of other components in a nonvolatile memory.

Each of the Wi-Fi module 823, the BT module 825, the GPS module 827, and the NFC module 828 may include a processor for processing data transmitted/received through a corresponding module. Although the cellular module 821, the Wi-Fi module 823, the BT module 825, the GPS module 827, and the NFC module 828 are shown as separate blocks in FIG. 8, according to an embodiment of the present disclosure, some (for example, at least two) of the cellular module 821, the Wi-Fi module 823, the BT module 825, the GPS module 827, and the NFC module 828 may be included in one integrated chip (IC) or an IC package. For example, at least some (for example, a CP corresponding to the cellular module 821 and a Wi-Fi processor corresponding to the Wi-Fi module 823) processors respectively corresponding to the cellular module 825, the Wi-Fi module 827, the BT module 828, the GPS module 821, and the NFC module 823 may be implemented with one SoC.

The RF module 829 may be responsible for data transmission/reception, for example, the transmission/reception of an RF signal. Although not shown in the drawings, the RF module 829 may include a transceiver, a power amp module (PAM), a frequency filter, or a low noise amplifier (LNA). Additionally, the RF module 829 may further include components for transmitting/receiving electromagnetic waves on a free space in a wireless communication, for example, conductors or conducting wires. Although the cellular module 821, the Wi-Fi module 823, the BT module 825, the GPS module 827, and the NFC module 828 share one RF module 829 shown in FIG. 8, according to an embodiment of the present disclosure, at least one of the cellular module 821, the Wi-Fi module 823, the BT module 825, the GPS module 827, and the NFC module 828 may perform the transmission of an RF signal through an additional RF module.

The SIM card 824 may be a card including a SIM and may be inserted into a slot formed at a specific position of an electronic device. The SIM card 824 may include unique identification information (for example, an integrated circuit card identifier (ICCID)) or subscriber information (for example, an international mobile subscriber identity (IMSI)). The SIM card 824 may correspond to the above-mentioned storage 180.

The memory 830 may include an internal memory 832 or an external memory 834. The internal memory 832 may include at least one of a volatile memory (for example, dynamic random access memory (DRAM), static RAM (SRAM), synchronous DRAM (SDRAM)) (for example, the memory 130) and a non-volatile memory (for example, one time programmable read only memory (OTPROM), PROM, erasable and programmable ROM (EPROM), electrically erasable and programmable ROM (EEPROM), mask ROM, flash ROM, NAND flash memory, and NOR flash memory) (for example, the storage 180).

According to an embodiment of the present disclosure, the internal memory 832 may be a Solid State Drive (SSD). The external memory 834 may further include flash drive, for example, compact flash (CF), secure digital (SD), micro Micro-SD, Mini-SD, extreme digital (xD), or a memory stick. The external memory 834 may be functionally connected to the electronic device 800 through various interfaces. According to an embodiment of the present disclosure, the electronic device 800 may further include a storage device (or a storage medium) such as a hard drive.

The sensor module 840 measures physical quantities or detects an operating state of the electronic device 800, thereby converting the measured or detected information into electrical signals. The sensor module 840 may include at least one of a gesture sensor 840A, a gyro sensor 840B, a barometric pressure sensor 840C, a magnetic sensor 840D, an acceleration sensor 840E, a grip sensor 840F, a proximity sensor 840G, a color sensor 840H (for example, a red, green, blue (RGB) sensor), a biometric sensor 840I, a temperature/humidity sensor 840J, an illumination sensor 840K, and an ultra violet (UV) sensor 840M. Additionally or alternatively, the sensor module 840 may include an E-nose sensor (not shown), an electromyography (EMG) sensor, an electroencephalogram (EEG) sensor (not shown), an electrocardiogram (ECG) sensor (not shown), an infrared (IR) sensor (not shown), an iris sensor (not shown), or a fingerprint sensor (not shown). The sensor module 840 may further include a control circuit for controlling at least one sensor therein.

The input device 850 may include a touch panel 852, a (digital) pen sensor 854, a key 856, or an ultrasonic input device 858. The touch panel 852 may recognize a touch input through at least one of capacitive, resistive, infrared, or ultrasonic methods, for example. Additionally, the touch panel 852 may further include a control circuit. In the case of the capacitive method, both direct touch and proximity recognition are possible. The touch panel 852 may further include a tactile layer. In this case, the touch panel 852 may provide a tactile response to a user.

The (digital) pen sensor 854 may be implemented through a method similar or identical to that of receiving a user's touch input or an additional sheet for recognition. The key 856 may include a physical button, an optical key, or a keypad, for example. The ultrasonic input device 858, as a device checking data by detecting sound waves through a microphone (for example, a microphone 888) in the electronic device 800, may provide wireless recognition through an input tool generating ultrasonic signals. According to an embodiment of the present disclosure, the electronic device 800 may receive a user input from an external device (for example, a computer or a server) connected to the electronic device 800 through the communication module 820.

The display 860 (for example, the display 150) may include a panel 862, a hologram device 864, or a projector 866. The panel 862 may include a liquid-crystal display (LCD) or an active-matrix organic light-emitting diode (AM-OLED). The panel 862 may be implemented to be flexible, transparent, or wearable, for example. The panel 862 and the touch panel 852 may be configured with one module. The hologram 864 may show three-dimensional images in the air by using the interference of light. The projector 866 may display an image by projecting light on a screen. The screen, for example, may be placed inside or outside the electronic device 800. According to an embodiment of the present disclosure, the display 860 may further include a control circuit for controlling the panel 862, the hologram device 864, or the projector 866.

The interface 870 may include an HDMI 872, a USB 874, an optical interface 876, or a D-subminiature (D-sub) 878, for example. The interface 870, for example, may be included in the communication interface 160 shown in FIG. 1. Additionally/alternately, the interface 870 may include a mobile high-definition link (MHL) interface, an SD card/multi-media card (MMC) interface, or an infrared data association (IrDA) standard interface.

The audio module 880 may convert sound into electrical signals and convert electrical signals into sounds. At least some components of the audio module 880, for example, may be included in the I/O interface 140 shown in FIG. 1. The audio module 880 may process sound information inputted/outputted through a speaker 882, a receiver 884, an earphone 886, or a microphone 888.

The camera module 891, as a device for capturing a still image and a video, may include at least one image sensor (for example, a front sensor or a rear sensor), a lens (not shown), an image signal processor (ISP) (not shown), or a flash (not shown) (for example, an LED or a xenon lamp).

The power management module 895 may manage the power of the electronic device 800. Although not shown in the drawings, the power management module 895 may include a power management IC (PMIC), a charger IC, or a battery or fuel gauge, for example.

The PMIC may be built in an IC or SoC semiconductor, for example. A charging method may be classified into a wired method and a wireless method. The charger IC may charge a battery and may prevent overvoltage or overcurrent flow from a charger. According to an embodiment of the present disclosure, the charger IC may include a charger IC for at least one of a wired charging method and a wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added.

The battery gauge may measure the remaining amount of the battery 896, or a voltage, current, or temperature of the battery 396 during charging. The battery 896 may store or generate electricity and may supply power to the electronic device 800 by using the stored or generated electricity. The battery 896, for example, may include a rechargeable battery or a solar battery.

The indicator 897 may display a specific state of the electronic device 800 or part thereof (for example, the AP 810), for example, a booting state, a message state, or a charging state. The motor 898 may convert electrical signals into mechanical vibration. Although not shown in the drawings, the electronic device 800 may include a processing device (for example, a GPU) for mobile TV support. A processing device for mobile TV support may process media data according to the standards such as digital multimedia broadcasting (DMB), digital video broadcasting (DVB), or media flow.

The electronic device 800 may perform a control to process an operation for selectively moving and storing data in a nonvolatile memory in one of a writeback mode and an ordered mode in correspondence to at least one of the property of an application relating to data (for example, a file) stored in a volatile memory and a file property. For example, when an application operates as background processing, the electronic device 180 may check the size of related data and when the size of related data is greater than a specified size, may perform a control to store the data through a writeback mode method. Additionally, when an application operates in a foreground processing method, the electronic device 800 may perform a control to store related data through a writeback mode method. In relation to other data processing, the electronic device 800 may support data processing according to the above-described various methods.

A method and electronic device for data processing disclosed in various embodiments of the present disclosure can minimize a delay due to data store processing.

Additionally, various embodiments of the present disclosure minimize a delay due to data store processing and provide the integrity of data in a predetermined level, so that it is possible to recovery data in a predetermine level in a specific situation (for example, a turn-off situation of an electronic device due to battery separation or battery voltage drop) of an electronic device.

Additionally, various embodiments of the present disclosure can minimize a screen delay by adaptively performing the processing of data property (for example, storage related data or screen update related data) during application function performance.

Each of the above-mentioned components of the electronic device according to various embodiments of the present disclosure may be configured with at least one component and the name of a corresponding component may vary according to the kind of an electronic device. An electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific IC (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor (for example, the processor 120) executes an instruction, it may perform a function corresponding to the instruction. The non-transitory computer-readable storage media may include the memory 130, for example. At least part of a programming module may be implemented (for example, executed) by the processor 120, for example. At least part of a programming module may include a module, a program, a routine, sets of instructions, or a process to perform at least one function, for example.

The computer-readable storage media may include Magnetic Media such as a hard disk, a floppy disk, and a magnetic tape, Optical Media such as Compact Disc ROM (CD-ROM) and DVD, Magneto-Optical Media such as Floptical Disk, and a hardware device especially to store and perform a program instruction (for example, a programming module) such as ROM, RAM, and flash memory. Additionally, a program instruction may include high-level language code executable by a computer using an interpreter in addition to machine code created by a complier. The hardware device may be configured to operate as at least one software module to perform an operation of various embodiments of the present disclosure and vice versa.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a memory configured to store a file;
    a storage configured to support journaling of the file stored in the memory; and
    a data processing module configured to process a journaling method of the file in any one mode of a writeback mode and an ordered mode in correspondence to at least one of a property of an application relating to the file and a property of the file such that an integrity of the stored file is provided while a delay in storing the stored file in the memory is minimized,
    wherein the data processing module is further configured to control to store the file in any one mode of a writeback mode and an ordered mode according to a size of the file.

2. The electronic device of claim 1, wherein the data processing module is further configured to control to store the file according to a writeback mode when an execution operation of the application is foreground processing.

3. The electronic device of claim 1, wherein the data processing module is further configured to control to store the file according to an ordered mode when an execution operation of the application is background processing.

4. The electronic device of claim 1, wherein the data processing module is further configured to control to store the file in a writeback mode when the size of the file is equal to or greater than a specified size.

5. The electronic device of claim 1, wherein the data processing module is further configured to control to store the file in an ordered mode when the size of the file is less than a specified size.

6. The electronic device of claim 1, wherein the data processing module is further configured to perform a variable definition and setup relating to writeback mode flag processing on a file node when writeback mode processing is determined by the application property.

7. The electronic device of claim 1, wherein the data processing module is further configured to check a directory property at a location where the file is stored and, when the directory property is a writeback mode setting, inherit the directory property to process the property of the file as writeback mode processing.

8. The electronic device of claim 1, wherein the data processing module is further configured to, when the application execution operation is background processing, check the size of the file, and, when the size of the file is greater than a specified value, control to store the file in a writeback mode.

9. The electronic device of claim 1, wherein the data processing module is further configured to, when the application execution operation is background processing, check a size of the file, and, when the size of the file is less than a specified value, control to store the file in an ordered mode.

10. A data processing method comprising:
    checking at least one of a property of a file related application stored in a memory and a property of the file;
    determining a journaling method of the file as any one mode of a writeback mode and an ordered mode in correspondence to at least one of the property of the application and the property of the file such that an integrity of the stored file is provided while a delay in storing the stored file in the memory is minimized; and
    storing the file in a storage according to the determined journaling method,
    wherein the storing of the file comprises storing the file in any one mode of a writeback mode and an ordered mode according to a size of the file.

11. The method of claim 10, wherein the storing of the file comprises storing the file according to a writeback mode when an execution operation of the application is foreground processing.

12. The method of claim 10, wherein the storing of the file comprises storing the file according to an ordered mode when an execution operation of the application is background processing.

13. The method of claim 10, wherein the storing of the file comprises storing the file in a writeback mode when the size of the file is equal to or greater than a specified size.

14. The method of claim 10, wherein the storing of the file comprises storing the file in an ordered mode when the size of the file is less than a specified size.

15. The method of claim 10, wherein the storing of the file comprises performing a variable definition and setup relating to writeback mode flag processing on a file node when writeback mode processing is determined by the application property.

16. The method of claim 10, wherein the storing of the file comprises:

checking a directory property at a location where the file is stored; and when the directory property is a writeback mode setting, inheriting the directory property to process the property of the file as writeback mode processing.

17. The method of claim 10, wherein the storing of the file comprises:

when the application execution operation is background processing, checking a size of the file and when the size of the file is greater than a specified value, processing the file in a writeback mode; and when the application execution operation is background processing, checking the size of the file and when the size of the file is less than a specified value, storing the file in an ordered mode.

18. A non-transitory computer-readable storage media where an instruction is stored in a form of a programming module, wherein the instruction is set to perform:

checking at least one of a property of a file related application and a property of the file stored in a memory; and storing the file in a storage by determining a journaling method of the file as one of a writeback mode and an ordered mode in correspondence to the checked property such that an integrity of the stored file is provided while a delay in storing the stored file in the memory is minimized, wherein the storing of the file comprises storing the file in any one mode of a writeback mode and an ordered mode according to a size of the file.

\* \* \* \* \*